US011372583B2

(12) United States Patent
Tajima et al.

(10) Patent No.: US 11,372,583 B2
(45) Date of Patent: Jun. 28, 2022

(54) STORAGE DEVICE AND CONTROL METHOD FOR MAINTAINING CONTROL INFORMATION IN THE EVENT OF POWER FAILURE

(71) Applicant: HITACHI, LTD., Tokyo (JP)

(72) Inventors: Sachie Tajima, Tokyo (JP); Shintaro Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/808,259

(22) Filed: Mar. 3, 2020

(65) Prior Publication Data

US 2020/0409604 A1    Dec. 31, 2020

(30) Foreign Application Priority Data

Jun. 25, 2019  (JP) .............................. JP2019-116944

(51) Int. Cl.
*G06F 3/06* (2006.01)
*G06F 12/1009* (2016.01)

(52) U.S. Cl.
CPC .......... *G06F 3/0659* (2013.01); *G06F 3/0622* (2013.01); *G06F 3/0685* (2013.01); *G06F 12/1009* (2013.01); *G06F 2212/657* (2013.01)

(58) Field of Classification Search
CPC .. G06F 3/0659; G06F 3/0622; G06F 12/1009; G06F 3/0685; G06F 2212/657; G06F 3/0619; G06F 3/0638
See application file for complete search history.

(56) References Cited

U.S. PATENT DOCUMENTS

| 7,613,877 | B2 | 11/2009 | Shimozono et al. |
| 9,927,985 | B2* | 3/2018 | Zhang ................. G06F 11/1441 |
| 2015/0347026 | A1* | 12/2015 | Thomas .............. G06F 12/0246 |
| | | | 711/103 |
| 2017/0039141 | A1* | 2/2017 | Yeh ....................... G06F 3/0656 |
| 2019/0018602 | A1 | 1/2019 | Koo et al. |

FOREIGN PATENT DOCUMENTS

| JP | 2003-263276 A | 9/2003 |
| JP | 2008108026 A | 5/2008 |

OTHER PUBLICATIONS

Office Action in related Japanese Patent Application No. 2019-116944 dated May 11, 2021; English translation provided (12 pages).

* cited by examiner

*Primary Examiner* — Michelle T Bechtold
(74) *Attorney, Agent, or Firm* — Procopio, Cory, Hargreaves & Savitch LLP

(57) ABSTRACT

To appropriately access data managed before a supply of power is stopped. A storage device that receives an I/O request from a host computer and performs an I/O processing in response to the I/O request includes a CPU, a nonvolatile medium, and a memory having access performance higher than that of the nonvolatile medium. The CPU stores control information about a control for performing the I/O processing in the memory and the nonvolatile medium. The control information stored in the nonvolatile medium includes address conversion information for converting a physical address of a drive in which target data of the I/O request is stored and a logical address that indicates a logical area of data stored in the physical address.

11 Claims, 17 Drawing Sheets

FIG. 5

| PHYSICAL ADDRESS | LOGICAL ADDRESS |
|---|---|
| 123456 | abcdef |
| 123457 | 02468a |

FIG. 6

| TYPE | ID | UPDATE TIME | READ IOPS | WRITE IOPS | READ TRANSFER RATE | WRITE TRANSFER RATE | CACHE HIT RATE |
|---|---|---|---|---|---|---|---|
| Vol | 001 | 10:15 | 25K | 20K | 6400M | 5000M | 10 |
| Vol | 002 | 10:15 | 10K | 0 | 10000M | 0 | 80 |

FIG. 7

| LOGICAL ADDRESS | STORAGE DATA |
|---|---|
| abcdef | 0x101010 |
| 02468a | 0x111111 |

STORAGE DEVICE AND CONTROL METHOD FOR MAINTAINING CONTROL INFORMATION IN THE EVENT OF POWER FAILURE

BACKGROUND OF THE INVENTION

1. Field of the Invention

The present invention relates to a technique for managing control information about an access control to user data managed by a storage device.

2. Description of the Related Art

Power supplied from a power source is stopped due to a power failure or the like in a storage device. Thereafter, it is requested that user data (simply referred to as data) created before the power failure or the like can be accessed after a power restoration in which the power supplied from the power source is restored.

The storage device performs an I/O processing (access processing) on data using control information provided in the storage device. Therefore, control information during the power restoration needs to be the same as control information before the power failure in order to perform an I/O processing during power restoration same as that before the power failure.

For example, JP-A-2008-108026 (Patent Literature 1) discloses a technique for storing data into a volatile memory and copying the data in the volatile memory to a nonvolatile memory by using power supplied from a battery when power supplied from a power source is stopped due to a power failure or the like.

For example, in a case where the storage device is a software defined storage (SDS) implemented by executing a storage control program on a general-purpose server, when the general-purpose server that constitutes the SDS is not provided with a battery, the control information cannot be copied to a nonvolatile medium by using power supplied from the battery during the power failure.

Even when the storage device includes a battery, power may not be appropriately supplied from the battery when the power failure occurs due to abnormality of the battery or the like, and the control information may not be copied to the nonvolatile medium.

SUMMARY OF THE INVENTION

The invention has been made in view of the above circumstances, and an object of the invention is to provide a technique for appropriately accessing data managed before a supply of power is stopped.

In order to achieve the above object, a storage device according to one aspect receives an I/O request from a host computer and performs an I/O processing in response to the I/O request. The storage device includes a processor unit, a nonvolatile medium, and a memory having access performance higher than that of the nonvolatile medium. The processor unit stores control information about a control of performing the I/O processing in the memory and the nonvolatile medium. The control information stored in the nonvolatile medium includes address conversion information for converting a physical address of a memory device in which target data of the I/O request is stored and a logical address that indicates a logical area of data stored in the physical address.

According to the invention, data managed before a supply of power is stopped can be appropriately accessed.

BRIEF DESCRIPTION OF THE DRAWINGS

FIG. 5 is a configuration diagram of a physical-logical address conversion table according to the first embodiment.

FIG. 6 is a configuration diagram of monitor information according to the first embodiment.

FIG. 7 is a configuration diagram of a cache according to the first embodiment.

DESCRIPTION OF THE PREFERRED EMBODIMENTS

Embodiments will be described with reference to the drawings. It should be noted that the embodiments described below do not limit the invention according to the claims, and all elements and combinations thereof described in the embodiments are not necessarily essential to the solution of the invention.

Information may be described by an expression of "AAA table" in the following description. Alternatively, the information may be represented by any data structure. That is, the "AAA table" may be referred to as "AAA information" to indicate that the information does not depend on the data structure.

A "processor unit" includes one or more processors in the following description. Typically, at least one processor is a microprocessor such as a central processing unit (CPU). The one or more processors may be a single core processor or a multi-core processor. The processors may include a hardware circuit that performs a part of or all the processing.

The processing may be described using a "program" as an operation subject in the following description. The program is executed by a processor unit to perform predetermined processing by appropriately using at least one of a storage unit (a memory or the like) and an interface unit. Therefore, a subject of the processing may be a processor unit (or a computer or a computer system including a processor unit). The program may be installed in the computer from a program source. The program source may be, for example, a program distribution server or a computer readable storage media. Two or more programs may be implemented as one program, or one program may be implemented as two or more programs in the following description. At least a part of the processing implemented by executing a program may be implemented by a hardware circuit (for example, an application specific integrated circuit (ASIC) or a field-programmable gate array (FPGA)).

Figure 1:
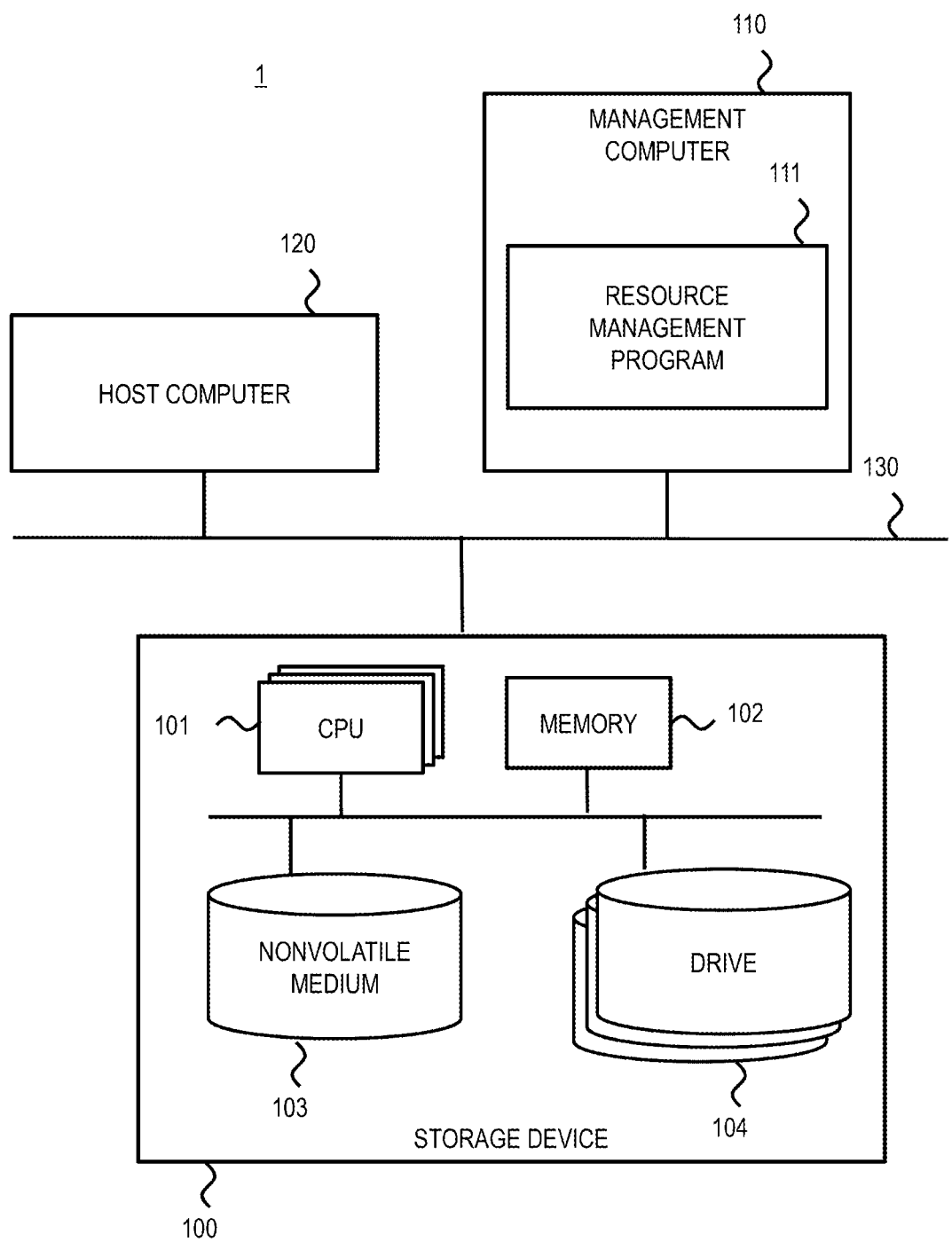
FIG. 1 is an overall configuration diagram of a computer system according to a first embodiment.

FIG. 1 is an overall configuration diagram of a computer system according to a first embodiment.

A computer system 1 includes one or more storage devices 100, one or more management computers 110, and one or more host computers 120. All or a part of the storage devices 100, the management computers 110, and the host computers 120 may be implemented by the same physical computer.

The storage device 100, the management computer 110, and the host computer 120 are connected via a network 130. The network 130 includes a wired local area network (LAN), a wireless LAN, or the Internet. A network connecting the storage device 100 and the management computer 110 and a network connecting the storage device 100 and the host computer 120 may be different networks.

The host computer 120 is, for example, a computer that executes an application program. The host computer 120 accesses a logical storage area (a virtual volume) provided by the storage device 100 via the network 130. The host computer 120 issues a read request or a write request which serves as an I/O (input and/or output) request to the storage device 100, and thereby accesses data (user data) stored in a virtual volume of the storage device 100.

The management computer 110 manages a resource of the storage device 100, for example, a configuration of a storage area, by executing a resource management program 111.

The storage device 100 is implemented by a computer such as a general-purpose server or a personal computer (PC). The storage device 100 includes one or more CPUs 101, a memory 102, a nonvolatile medium 103, and a drive 104 which serves as an example of a memory device.

The CPU 101 performs various types of processings in accordance with programs stored in the memory 102 and/or the drive 104. The memory 102 includes, for example, a random access memory (RAM), and stores a program to be executed by the CPU 101 and necessary information. A latency of the memory 102 is shorter than a latency of the nonvolatile medium 103. The drive 104 is, for example, a hard disk drive (HDD) or a solid state drive (SSD), and stores a program to be executed by the CPU 101, data to be used by the CPU 101, user data to be used by the host computer 120, and the like.

The nonvolatile medium 103 is a medium that can maintain data storage even when power is not supplied, and may be a nonvolatile memory such as a flash memory or a drive such as an HDD or an SSD. The nonvolatile medium 103 and the drive 104 are shown separately in FIG. 1. Alternatively, the drive 104 may be used as the nonvolatile medium 103. In this case, the nonvolatile medium 103 does not need to be provided separately from the drive 104.

Next, a configuration of the memory 102 of the storage device 100 will be described.

Figure 2:
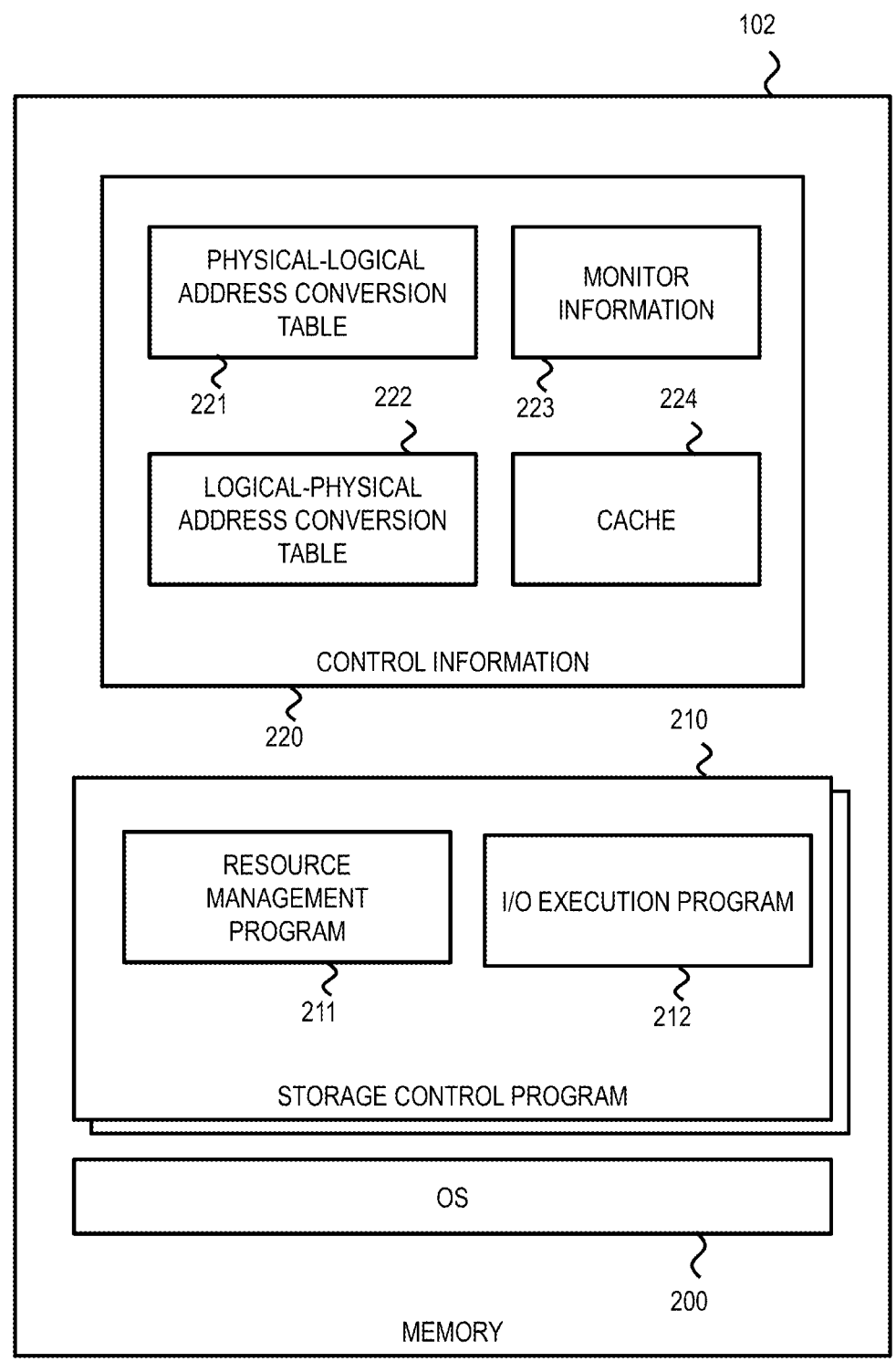
FIG. 2 is a configuration diagram of a memory of a storage device according to the first embodiment.

FIG. 2 is a configuration diagram of the memory of the storage device according to the first embodiment.

The memory 102 of the storage device 100 stores an operating system (OS) 200, one or more storage control programs 210, and control information 220. The control information 220 is updated every time the I/O processing changes in the memory 102, and is reflected by control information in the drive 104 at a long cycle until a storage operation is normally ended.

The OS 200 is executed by the CPU 101 to perform a processing of controlling an execution of a program in the storage device 100. For example, the OS 200 performs a processing of assigning a storage area of the memory 102 or the like to a virtual address space 300 (see FIG. 3) of the storage control program 210.

The storage control program 210 includes a resource management program 211 and an I/O execution program 212. The processing of each program will be described below.

The control information 220 is information that is to be used by the storage control program 210 and used to control an I/O processing in response to an I/O request from the host computer 120. The control information 220 includes a physical-logical address conversion table 221, a logical-physical address conversion table 222, monitor information 223, and a cache 224. Various types of information included in the control information 220 will be described below.

Next, information that is stored in the memory 102, the nonvolatile medium 103, and the drive 104 and is used by the storage control program 210 will be described.

Figure 3:
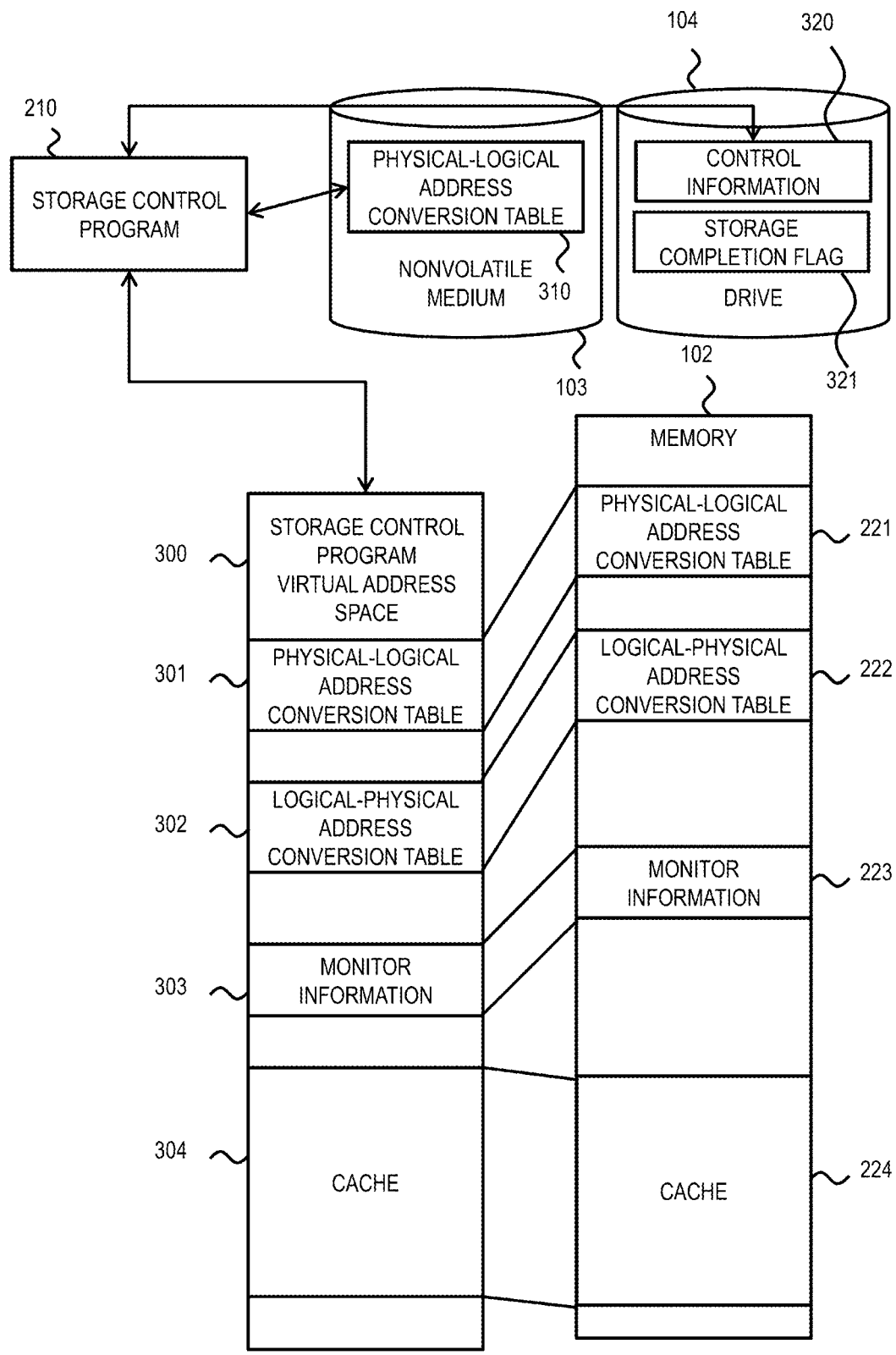
FIG. 3 is a diagram showing information stored in the memory, a nonvolatile medium, and a drive according to the first embodiment.

FIG. 3 is a diagram showing the information stored in the memory, the nonvolatile medium, and the drive according to the first embodiment.

The memory 102 stores the physical-logical address conversion table 221, the logical-physical address conversion table 222, the monitor information 223, and the cache 224.

The OS 200 provides the storage control program 210 with the CPU 101 and the memory 102. An area of the memory 102 assigned to the storage control program 210 by the OS 200 is managed as an address space, that is, the virtual address space 300 in the storage control program 210. A physical-logical address conversion table 301, a logical-physical address conversion table 302, monitor information 303, and a cache 304 are virtually stored in the virtual address space 300. That is, an entity of the physical-logical address conversion table 301 in the virtual address space 300 is the physical-logical address conversion table 221 in the memory 102, an entity of the logical-physical address conversion table 302 is the logical-physical address conversion table 222 in the memory 102, an entity of the monitor information 303 is the monitor information 223 in the memory 102, and an entity of the cache 304 is the cache 224 in the memory 102.

The CPU 101 executing the storage control program 210 uses a virtual address in the virtual address space 300 to issue an access request for various types of information, and thereby acquires various types of information. At this time, when the CPU 101 executing the OS 200 detects the access request from the storage control program 210, the virtual address is converted into a physical address indicating a position in the memory 102, the physical address is used to access information stored in the memory 102, and an access result is returned to the storage control program 210.

A physical-logical address conversion table 310 in the control information is stored in the nonvolatile medium 103.

The drive 104 stores control information 320 corresponding to the control information in the memory 102 at a predetermined time point (for example, a previous end time point of the storage device 100), and a storage completion flag 321 that serves as an example of normal storage information indicating whether the control information 320 is normally stored into the drive 104. The storage completion flag is deleted when the storage device is in operation and is stored when the operation is normally completed. The control information 320 stored in the drive 104 may include the physical-logical address conversion table 221, the logical-physical address conversion table 222, the monitor information 223, and the cache 224 in the memory 102, or may include the physical-logical address conversion table 221 only.

Next, the logical-physical address conversion table 222 will be described in detail.

The storage control program 210 is a program that issues an I/O request to the drive 104. The storage control program 210 uses a physical address and a logical address.

The physical address is a value for uniquely identifying a storage position of the data in the drive 104 to which the I/O request is issued. The physical address is obtained by sequentially assigning a number to a storage area of the drive 104.

On the other hand, the logical address is a value generated by the storage control program 210 to facilitate the access to the drive 104, and is obtained by assigning a number to a space in a logical storage area such that the storage control program 210 can be easily managed. The logical address is, for example, an address notified to the host computer 120. The logical address is specified in the I/O request from the host computer 120. The logical address corresponds to the physical address on a one-to-one basis.

The logical-physical address conversion table 222 is a table for converting the logical address into the physical address, that is, uniquely specifying the physical address from the logical address. The logical address is obtained by assigning a number to a space and a logical address space has a size larger than that of a physical address space. Therefore, a data volume in the logical-physical address conversion table 222 increases when a corresponding relationship between the logical address and the physical address is managed in a one-stage table. Therefore, in order to prevent the data volume in the logical-physical address conversion table 222 from becoming extremely large, a multi-stage table configuration is used in the present embodiment.

Figure 4:
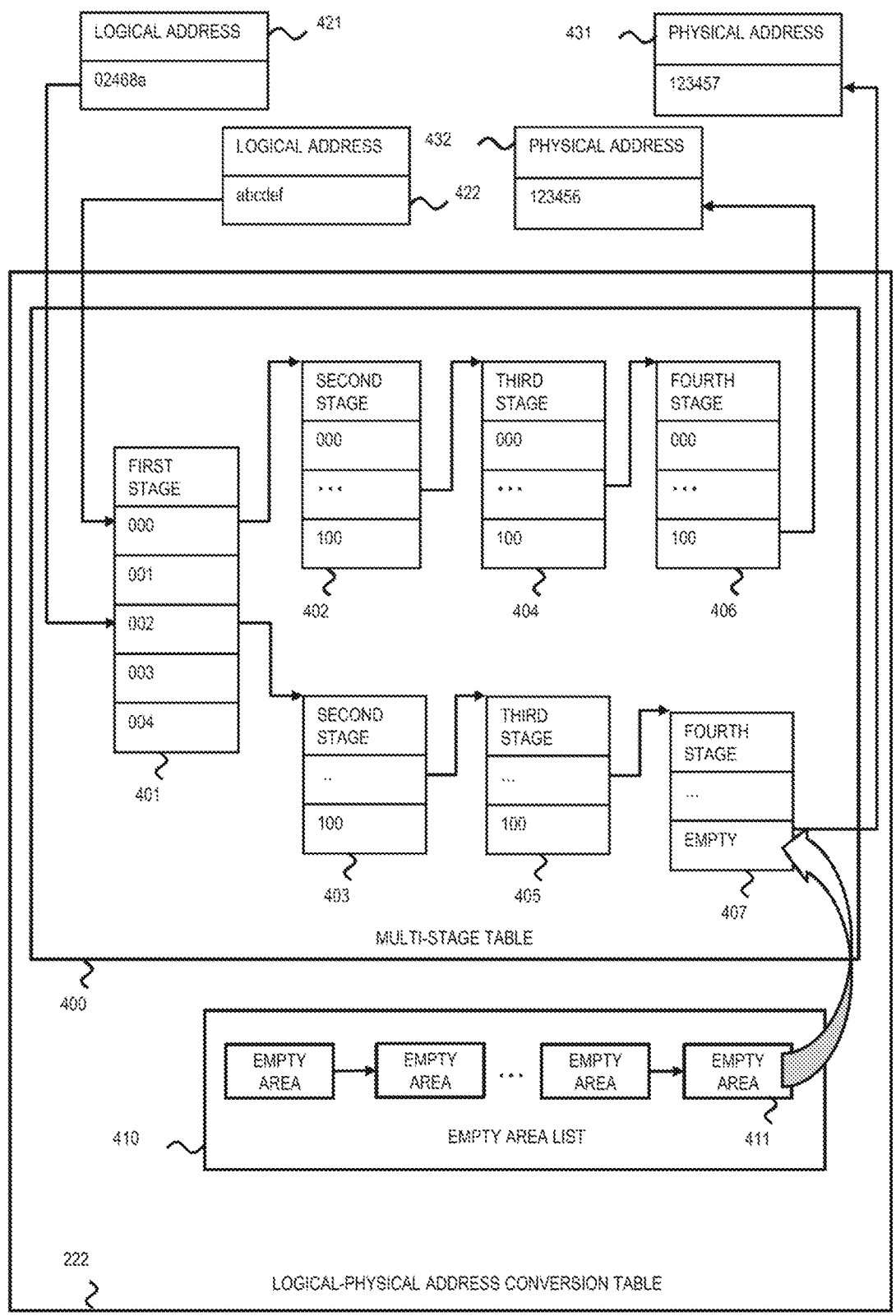
FIG. 4 is a configuration diagram of a logical-physical address conversion table according to the first embodiment.

FIG. 4 is a configuration diagram of the logical-physical address conversion table according to the first embodiment.

The logical-physical address conversion table 222 includes a multi-stage table 400 and an empty area list 410. The empty area list 410 is a list of entries 411 of empty areas that can be assigned to the multi-stage table 400. No value is stored in the entries 411 managed in the empty area list 410. At a time point when an entry needs to be assigned to the multi-stage table 400, the entry 411 in the empty area list 410 is released from the empty area list 410 and assigned to the multi-stage table 400.

The multi-stage table 400 includes stages tables 401 to 407 in multiple stages. A table in each stage can manage an entry corresponding to a target logical address, identify an entry corresponding to the logical address, and follows up a table in a subsequent stage in accordance with a value of the identified entry. Then, a physical address corresponding to the logical address can be acquired from an entry of a table in a final stage that can be uniquely followed up by the logical address. When a physical address is not assigned to the target logical address, the entry identified by the logical address is empty. For example, when a physical address is assigned to the logical address, the final entry 411 in the empty area list 410 is opened, and the entry is used as an entry of the table identified by the logical address and is set to be able to acquire the assigned physical address.

Here, an example in which a physical address corresponding to a logical address 422 (for example, abcdef) is acquired using the logical-physical address conversion table 222 will be described. First, an entry (for example, a 000 entry) corresponding to the logical address 422 is identified from a first stage table 401. A second stage table 402 can be followed up from this entry. Next, an entry corresponding to the logical address 422 is identified from the second stage table 402. A third stage table 404 can be followed up from this entry. Similarly, a fourth stage table 406 can be followed up. An entry corresponding to the logical address 422 is identified from the fourth stage table 406. A physical address 432 (for example, 123456) can be acquired by following up a pointer of the entry.

Next, an example in which a physical address corresponding to a logical address 421 (for example, 02468a) is registered in the logical-physical address conversion table 222 will be described. First, the logical address 421 can follow up a table in each stage, so that a fourth stage table 407 can be identified. Here, when an entry corresponding to the logical address 421 is identified from the table 407, since a physical address is not assigned, the entry is empty. At this time, the final entry 411 of the empty area list 410 is released from the empty area list 410 and assigned as the entry of the fourth table 407. Next, a pointer to a physical address 431 assigned to the logical address 421 is stored in the entry. Thereafter, the physical address 431 corresponding to the logical address 421 can be acquired accordingly.

Next, the physical-logical address conversion table 221 will be described in detail.

FIG. 5 is a configuration diagram of the physical-logical address conversion table according to the first embodiment.

The physical-logical address conversion table 221 is a table for converting a physical address into a logical address, that is, uniquely specifying a logical address from a physical address. A physical address space has a size smaller than that of a logical address space. Therefore, different from the logical-physical address conversion table 222, a data volume can be reduced relatively even when the physical-logical address conversion table 221 is implemented by a one-stage table. Therefore, the physical-logical address conversion table 221 is implemented as a one-stage table in the present embodiment.

The physical-logical address conversion table 221 stores entries corresponding to physical addresses. For example, the entries are arranged in an ascending order of the physical addresses. Entries of the physical-logical address conversion table 221 include fields of a physical address 501 and a logical address 502. The physical address 501 stores physical addresses of the drive 104. The logical address 502 stores logical addresses assigned to the physical addresses of the physical address 501 in the entries.

According to an entry in the first row of the physical-logical address conversion table 221 in FIG. 5, a logical address 422 (a value is abcdef) can be acquired from a physical address 432 (a value is 123456).

Here, in order to access the data of the drive 104 according to the I/O request, a corresponding relationship between the logical address and the physical address necessary for conversion between the logical address and the physical address is needed. The corresponding relationship between the logical address and the physical address is managed by the physical-logical address conversion table 221 and the logical-physical address conversion table 222. When both tables are lost, the corresponding relationship between the logical address and the physical address can not be generated. Therefore, information of either the physical-logical address conversion table 221 or the logical-physical address conversion table 222 is information necessary for accessing data in response to the I/O request, and can be referred to as information that can not be generated when the physical-logical address conversion table 221 or the logical-physical address conversion table 222 is lost. In the present embodiment, the physical-logical address conversion table 221 is a one-stage table, has a small size, and does not be referred to for every I/O request. Therefore, the physical-logical address conversion table 221 is used as target storage information. Part information including the physical-logical address conversion table in the control information may be used as the target storage information.

Next, the monitor information 223 will be described in detail.

FIG. 6 is a configuration diagram of the monitor information according to the first embodiment.

The monitor information 223 stores information of resources of the storage device 100. The monitor information 223 stores an entry for each resource. Entries of the monitor information 223 include fields of a type 511, an ID 512, an update time 513, a read IOPS 514, a write IOPS 515, a read transfer rate 516, a write transfer rate 517, and a cache hit rate 518.

The type 511 stores a type of a resource corresponding to an entry. The ID 512 stores an ID for uniquely identifying a resource corresponding to an entry. The update time 513 stores an update time when a content of an entry is updated. The read IOPS 514 stores an input/output per second (IOPS) relating to a read in a resource (here, a volume) corresponding to an entry. The write IOPS 515 stores an IOPS relating to a write in a resource (here, a volume) corresponding to an entry. The read transfer rate 516 stores a transfer rate during a read in a resource corresponding to an entry. The write transfer rate 517 stores a transfer rate during a write in a resource corresponding to an entry. The cache hit rate 518 stores a cache hit rate in a resource corresponding to an entry.

A resource registered in the monitor information 223 may be a resource other than a volume, and may be a CPU or the like. Information of a resource stored in an entry may include information about performance other than those described above, or may include information about a usage status of a resource such as a usage rate of a volume.

For example, information about a volume (Vol) identified by an ID 002 is stored in an entry 520 of the monitor information 223. According to this entry, it is known that information of this entry is updated at 10:15, a read IOPS of the volume is 10 k, a write IOPS is 0, a read transfer rate is 10,000 MB/s, a write transfer rate is 0 MB/s, and a cache hit rate is 80%.

Next, the cache 224 will be described.

FIG. 7 is a configuration diagram of the cache according to the first embodiment.

The cache 224 manages a part of user data in order to improve response performance of an access. The cache 224 stores an entry for each cached user data. Entries of the cache 224 include fields of a logical address 521 and a storage data 522. The logical address 521 stores a logical address corresponding to an entry. The storage data 522 stores user data that is stored in a physical address of the drive 104 corresponding to a logical address in an entry of the logical address 521.

For example, an entry 530 of the cache 224 stores 0x101010 which is user data stored in a storage area of the drive 104 and identified by a logical address abcdef. Similar to the logical-physical address conversion table 222, the cache 224 may be managed by a multi-stage table.

Next, a processing operation of the storage device 100 will be described.

Figure 8:
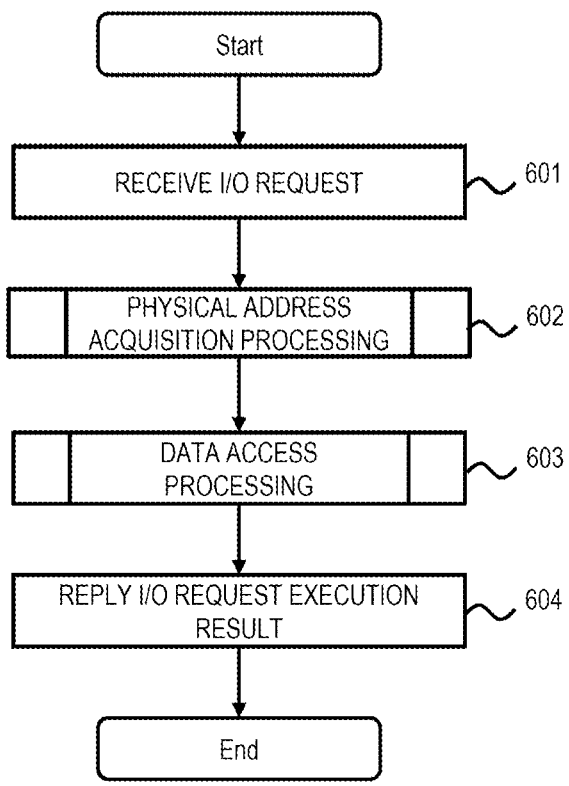
FIG. 8 is a flowchart of an I/O processing according to the first embodiment.

FIG. 8 is a flowchart of an I/O processing according to the first embodiment.

When receiving an I/O request from the host computer 120 (step 601), the I/O execution program 212 (strictly, the CPU 101 executing the I/O execution program 212) of the storage control program 210 performs a physical address acquisition processing (see FIG. 9) to acquire a physical address of the drive 104 to which the I/O request is issued (step 602).

Next, the I/O execution program 212 performs a data access processing (see FIG. 10) on a storage area of the drive 104 identified by the physical address acquired in step 602, and thereby accesses the drive 104 (step 603).

Thereafter, the I/O execution program 212 responds (notifies) a result of the data access processing to the host computer 120 (step 604).

Next, the physical address acquisition processing (step 602) will be described.

Figure 9:
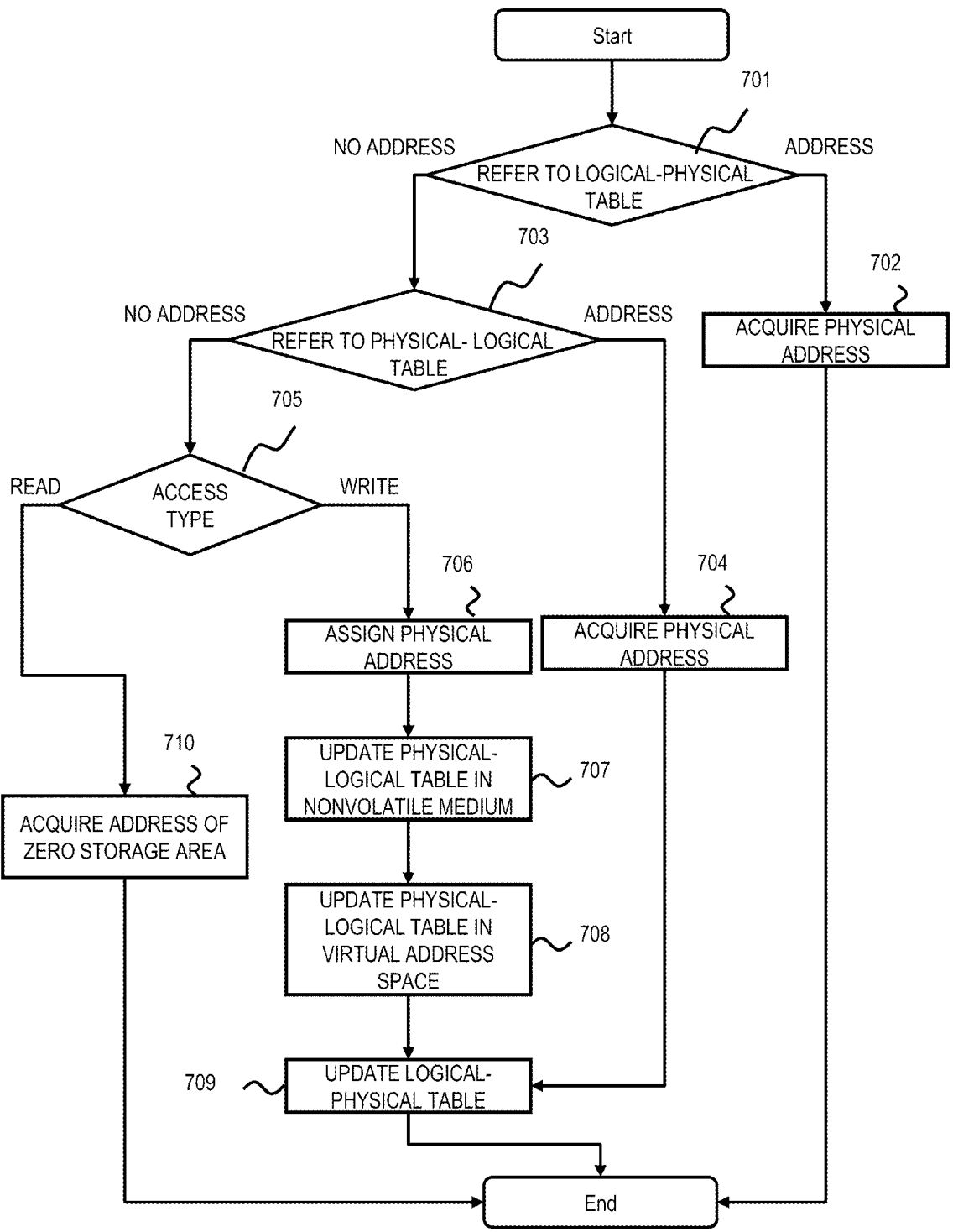
FIG. 9 is a flowchart of a physical address acquisition processing according to the first embodiment.

FIG. 9 is a flowchart of the physical address acquisition processing according to the first embodiment. It should be noted that a physical-logical address conversion table may be described as a physical-logical table and a logical-physical address conversion table may be described as a logical-physical table in FIG. 9 and subsequent figures.

The I/O execution program 212 (strictly, the CPU 101 executing the I/O execution program 212) of the storage control program 210 acquires a logical address (referred to as a target logical address in the description of the processing) as an I/O request destination included in the received I/O request, refers to the logical-physical address conversion table 222 in the memory 102, and searches for a physical address corresponding to the target logical address (step 701).

As a result, when the physical address corresponding to the target logical address is stored in the logical-physical address conversion table 222 (step 701: address), the I/O execution program 212 acquires the physical address (step 702), and ends the physical address acquisition processing.

On the other hand, when the physical address corresponding to the target logical address is not stored in the logical-physical address conversion table 222 (step 701: no address), the I/O execution program 212 refers to the physical-logical address conversion table 221 and searches for the target logical address (step 703).

As a result, when the target logical address is stored in the physical-logical address conversion table 221 (step 703: address), which means that the physical address for the target logical address may not be stored in the logical-physical address conversion table 222 due to a power failure or the like, the I/O execution program 212 refers to the physical-logical address conversion table 221, acquires the physical address corresponding to the target logical address (step 704), and proceeds the processing to step 709.

On the other hand, when the target logical address is not stored in the physical-logical address conversion table 221

(step 703: no address), which means that a physical address is not assigned to the logical address, the I/O execution program 212 confirms an access type of the I/O request (step 705).

As a result, when the access type of the I/O request is write (step 705: write), the I/O execution program 212 assigns a physical address corresponding to the target logical address (step 706), registers a set of the target logical address and the assigned physical address in the physical-logical address conversion table 310 in the nonvolatile medium 103 (step 707), and stores the set of the target logical address and the assigned physical address into the physical-logical address conversion table 301 of the virtual address space 300 (step 708). When the I/O execution program 212 stores the set of the target logical address and the assigned physical address into the physical-logical address conversion table 301 of the virtual address space 300, the OS 200 stores the set of the target logical address and the assigned physical address into the physical-logical address conversion table 221 of the memory 102 corresponding to an area in the virtual address space 300.

After step 704 or step 708 is performed, the I/O execution program 212 registers the set of the target logical address and the corresponding physical address in the logical-physical address conversion table 222 (step 709), and ends the physical address acquisition processing.

On the other hand, when the access type of the I/O request is read in step 705 (step 705: read), the I/O execution program 212 acquires a physical address of an area where zero is stored (zero storage area) (step 710), and ends the physical address acquisition processing.

In the physical address acquisition processing performed for each I/O request, a physical address can be acquired by only accessing the logical-physical address conversion table as long as the physical address is stored in the logical-physical address conversion table.

Next, the data access processing (step 603) will be described.

Figure 10:
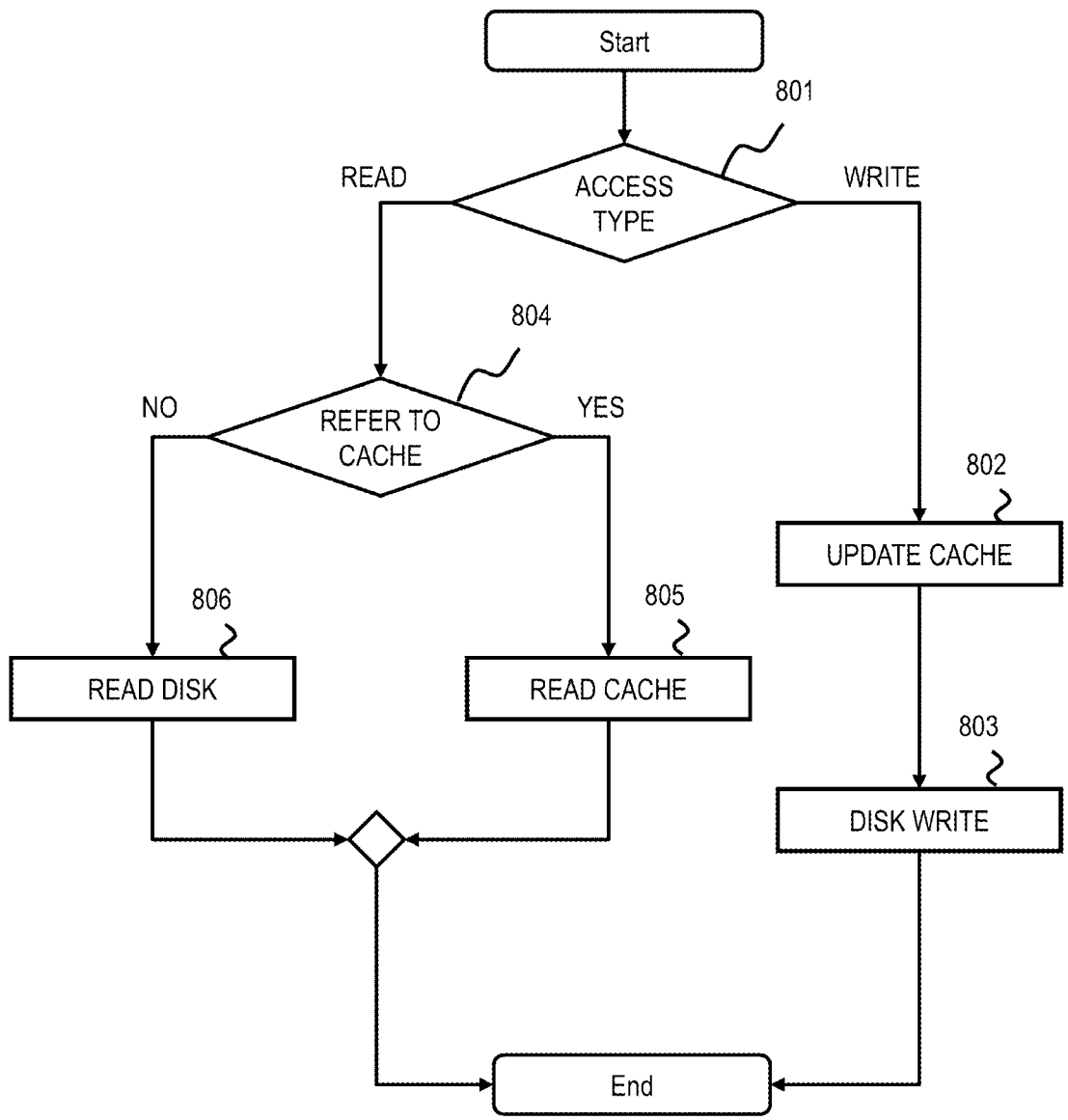
FIG. 10 is a flowchart of a data access processing according to the first embodiment.

FIG. 10 is a flowchart of the data access processing according to the first embodiment.

The I/O execution program 212 (strictly, the CPU 101 executing the I/O execution program 212) of the storage control program 210 confirms an access type included in the received I/O request (step 801).

As a result, when the access type is write (step 801: write), the I/O execution program 212 stores an address of an access target (access target address) of the I/O request into the logical address 521 of the cache 224, and stores data to be written (write data) into the storage data 522 in response to the I/O request (step 802). Next, the I/O execution program 212 stores the write data into a storage area of the drive 104 that is identified by the physical address acquired in step 602 (step 803), and ends the data access processing.

On the other hand, when the access type is read in step 801 (step 801: read), the I/O execution program 212 refers to the cache 224 and searches whether the access target address of the I/O request is stored in the logical address 521 (step 804).

As a result, when the access target address of the I/O request is stored in the logical address 521 (step 804: Yes), the I/O execution program 212 acquires (reads) data from the storage data 522 in a corresponding entry (step 805), and ends the data access processing.

On the other hand, when the access target address of the I/O request is not stored in the logical address 521 (step 804: No), the I/O execution program 212 acquires (reads) data from the storage area of the drive 104 that is identified by the physical address acquired in step 602 (step 806), and ends the data access processing.

Next, a monitor information acquisition processing will be described.

The monitor information acquisition processing is a processing for acquiring monitor information obtained by monitoring a target resource. For example, the monitor information acquisition processing may be performed periodically, may be performed when information stored in the entry 520 of the monitor information 223 is updated as an extension of the I/O processing, or may be performed in response to an instruction from a user.

Figure 11:
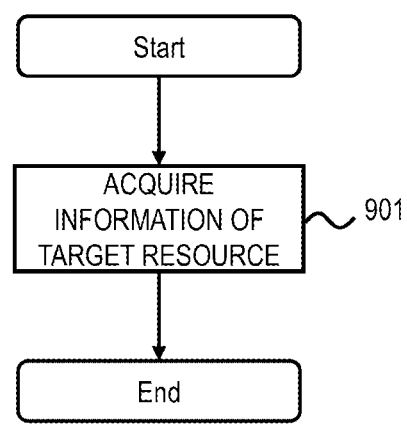
FIG. 11 is a flowchart of a monitor information acquisition processing according to the first embodiment.

FIG. 11 is a flowchart of the monitor information acquisition processing according to the first embodiment.

The resource management program 211 (strictly, the CPU 101 executing the resource management program 211) of the storage control program 210 acquires information that relates to a target resource and is stored in the entry 520 of the monitor information 223, stores the information into the monitor information 223 (step 901), and ends the monitor information acquisition processing. The target resource for collecting monitor information may be, for example, all resources to be controlled by the storage control program 210, or may be only a resource specified by the user.

Next, a monitor information display processing will be described.

The monitor information display processing may be performed, for example, in response to an instruction from the user, or may be performed periodically.

Figure 12:
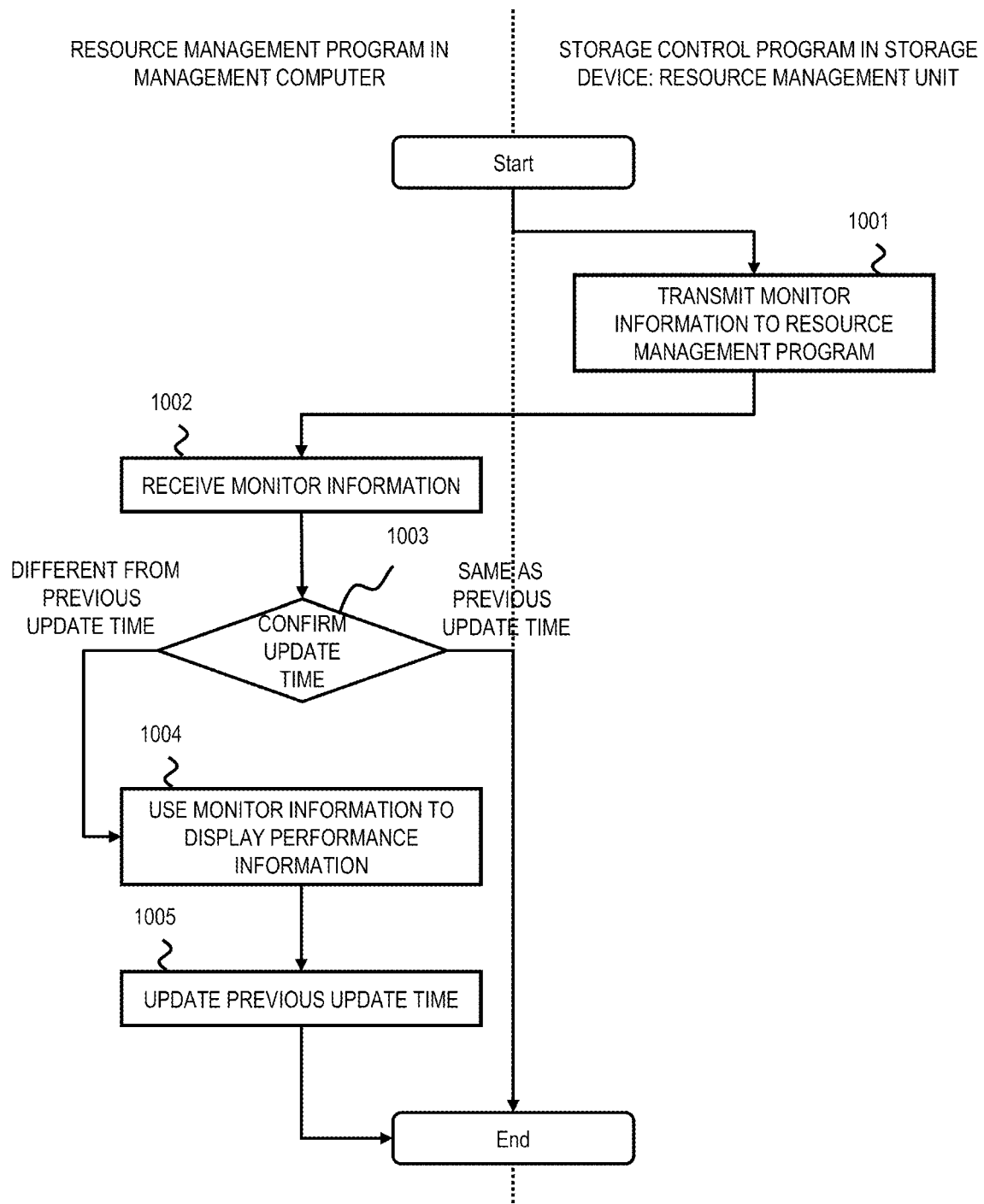
FIG. 12 is a flowchart of a monitor information display processing according to the first embodiment.

FIG. 12 is a flowchart of the monitor information display processing according to the first embodiment.

The resource management program 211 of the storage control program 210 in the storage device 100 transmits the entry 520 stored in the monitor information 223 of the memory 102 to the resource management program 111 of the management computer 110 (step 1001).

On the other hand, the resource management program 111 (strictly, a processor of the management computer 110 executing the resource management program 111) of the management computer 110 receives the entry of the monitor information 223 transmitted from the storage control program 210 of the storage device 100 (step 1002).

Next, the resource management program 111 compares an update time in the update time 513 of the entry 520 of the received monitor information with a previous update time, that is, an update time in the monitor information 223 used for a previous display (step 1003).

As a result, when the update time stored in the received monitor information is the same as the previous update time (step 1003: the same as the previous update time), a current display is a latest state. Accordingly, the resource management program 111 ends the processing.

On the other hand, when the update time stored in the received monitor information is different from the previous update time (step 1003: different from the previous update time), which means that the monitor information 223 is newly updated, the resource management program 111 displays information obtained from the entry 520 of the received monitor information 223 on a performance information display screen 1100 (see FIG. 13) (step 1004). Next, the resource management program 111 changes the previous update time to the update time stored in the monitor information 223 received in step 1002 (step 1005), and ends the monitor information display processing.

In addition to the monitor information display processing, the resource management program 111 of the management computer 110 may perform, for example, a processing of changing a resource assignment in the storage device 100 by using the monitor information, or may perform a load distribution processing in the storage device 100.

Next, the performance information display screen 1100 will be described.

Figure 13:
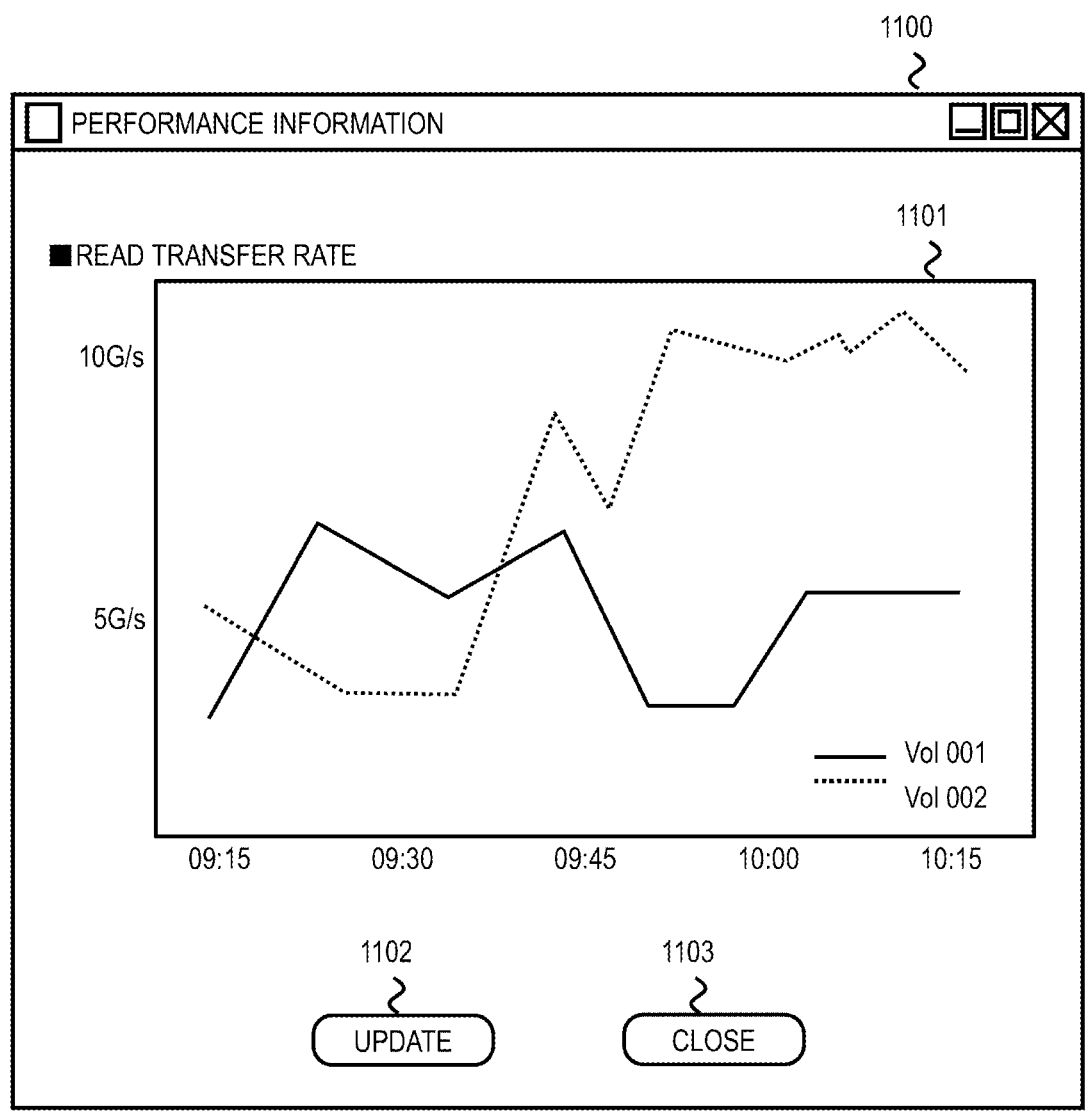
FIG. 13 is a configuration diagram of a performance information display screen according to the first embodiment.

FIG. 13 is a configuration diagram of the performance information display screen according to the first embodiment.

The performance information display screen 1100 includes a performance information display area 1101, an update button 1102, and a close button 1103.

A time series graph of performance of a target resource obtained from the monitor information 223 is displayed on the performance information display area 1101. For example, the time series graph of the performance of the target resource obtained from the monitor information 223 is displayed on the performance information display area 1101 based on read transfer rates obtained from the read transfer rate 516 of the monitor information 223. An example shown in FIG. 13 displays graphs indicating read transfer rates of volumes identified by Vol 001 and Vol 002 from a time point 9:15 to a time point 10:15. A time range displayed in the performance information display area 1101 may be different from the time range in the example shown in FIG. 13. A type of performance information to be displayed in the performance information display area 1101 is not limited to the read transfer rates, and may be other performance information, for example, IOPS or a cache hit rate. When usage rate information of a volume is stored in the monitor information 223, the usage rate information of the volume may be displayed.

The update button 1102 is a button for receiving an instruction to perform the monitor information display processing. When the user presses the update button 1102, the resource management program 111 starts to perform the monitor information display processing shown in FIG. 12. Accordingly, latest performance information is displayed on the performance information display screen 1100. A trigger for the user to press the update button 1102 may include a case where the storage device 100 starts to perform the monitor information acquisition processing shown in FIG. 11.

The close button 1103 is a button for receiving an instruction to close the performance information display screen 1100. When the user presses the close button 1103, the resource management program 111 closes the performance information display screen 1100 and ends the operation.

Next, a startup processing performed when the storage device 100 is started will be described.

Figure 14:
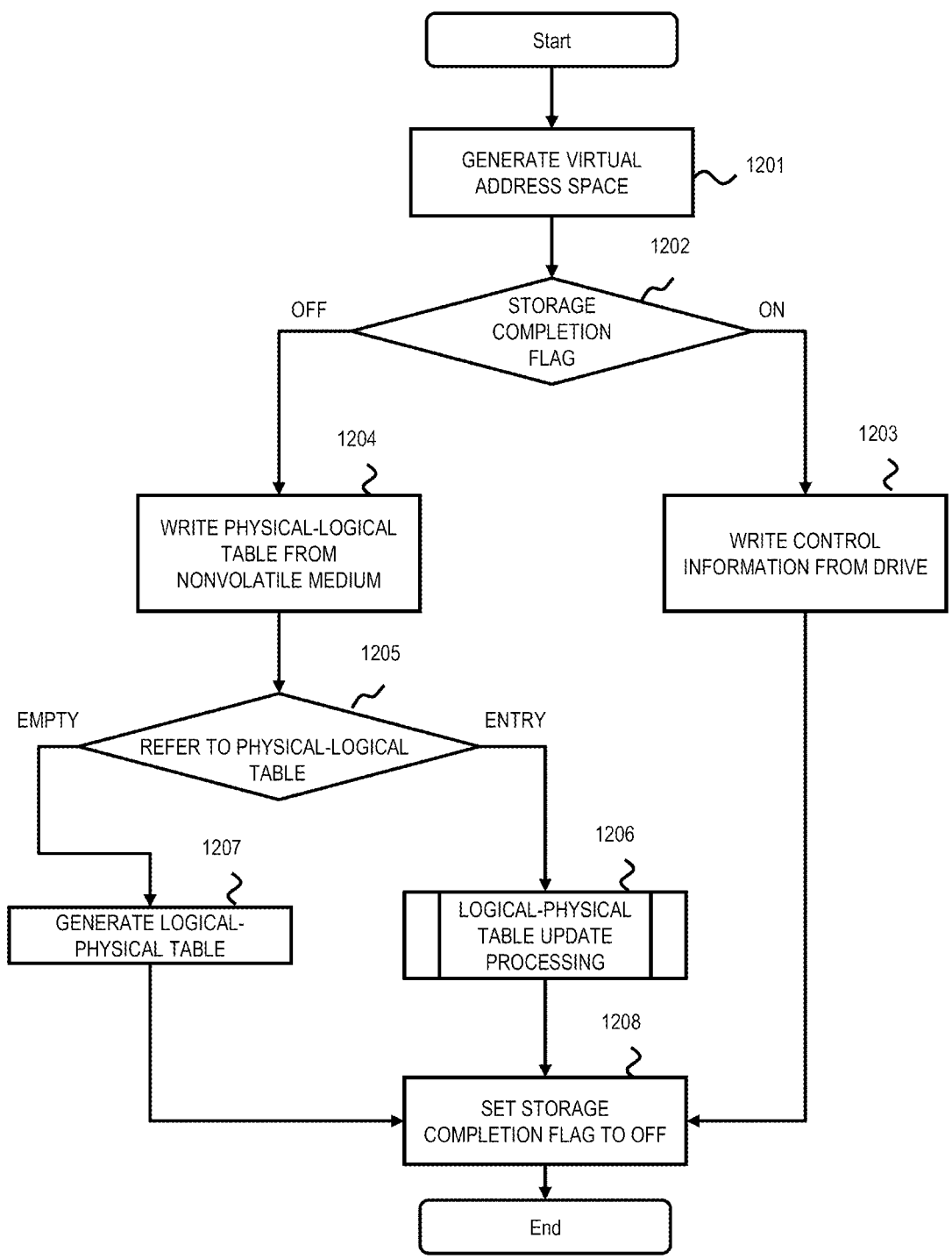
FIG. 14 is a flowchart of a startup processing according to the first embodiment.

FIG. 14 is a flowchart of the startup processing according to the first embodiment.

The storage control program 210 (strictly, the CPU 101 executing the storage control program 210) associates a space in the memory 102 that is assigned by the OS 200 with the virtual address space 300 in the storage control program 210, and thereby performs a processing of generating the virtual address space 300 (step 1201).

Next, the storage control program 210 refers to the storage completion flag 321 stored in the drive 104 (step 1202). As a result, when the storage completion flag 321 is ON (step 1202: ON), which means that the control information is normally stored in the drive 104, the storage control program 210 writes the control information 320 stored in the drive 104 into the virtual address space 300 (step 1203), and proceeds the processing to step 1208.

On the other hand, when the storage completion flag 321 is OFF (step 1202: OFF), which means that the control information is normally not stored in the drive 104, the storage control program 210 writes the physical-logical address conversion table 310 stored in the nonvolatile medium 103 into the virtual address space 300 (step 1204).

Next, the storage control program 210 refers to the physical-logical address conversion table 301 in the virtual address space 300 (step 1205). As a result, when a set (an entry) of a physical address and a logical address is stored in the physical-logical address conversion table 301 (step 1205: entry), a corresponding relationship between the physical address and the logical address corresponding to the entry needs to be registered in a logical-physical address conversion table. Accordingly, the storage control program 210 performs a logical-physical table update processing (see FIG. 15) (step 1206), and proceeds the processing to step 1208. In step 1206, the storage control program 210 stores an empty area corresponding to a capacity of an unassigned physical address in the empty area list.

On the other hand, when the entry is not stored in the physical-logical address conversion table 301 (step 1205: empty), which means that the user data is not stored in the drive 104 of the storage device 100, the storage control program 210 generates a new logical-physical address conversion table 222 in the virtual address space 300 (step 1207), and proceeds the processing to step 1208. In step 1207, the storage control program 210 sets an empty entry in entries stored in the logical-physical address conversion table 222, and stores an empty area corresponding to an assignable capacity into the empty area list 410.

In step 1208, the storage control program 210 sets the storage completion flag 321 in the drive 104 to OFF, and ends the processing.

When the storage completion flag is OFF in step 1202, the monitor information 223 and the cache 224 are newly generated.

According to the startup processing described above, even when a supply from a power source is cut off due to a power failure or the like (a power outage occurs) and the control information 320 can not be normally stored in the drive 104, the logical-physical address conversion table 302 (222) can be accurately rep-generated using the physical-logical address conversion table 310 in the nonvolatile medium 103, and thereafter, a physical address corresponding to a logical address can be appropriately specified using the logical-physical address conversion table 302 and a corresponding area in the drive 114 can be accessed.

Next, the logical-physical table update processing (step 1206) will be described.

Figure 15:
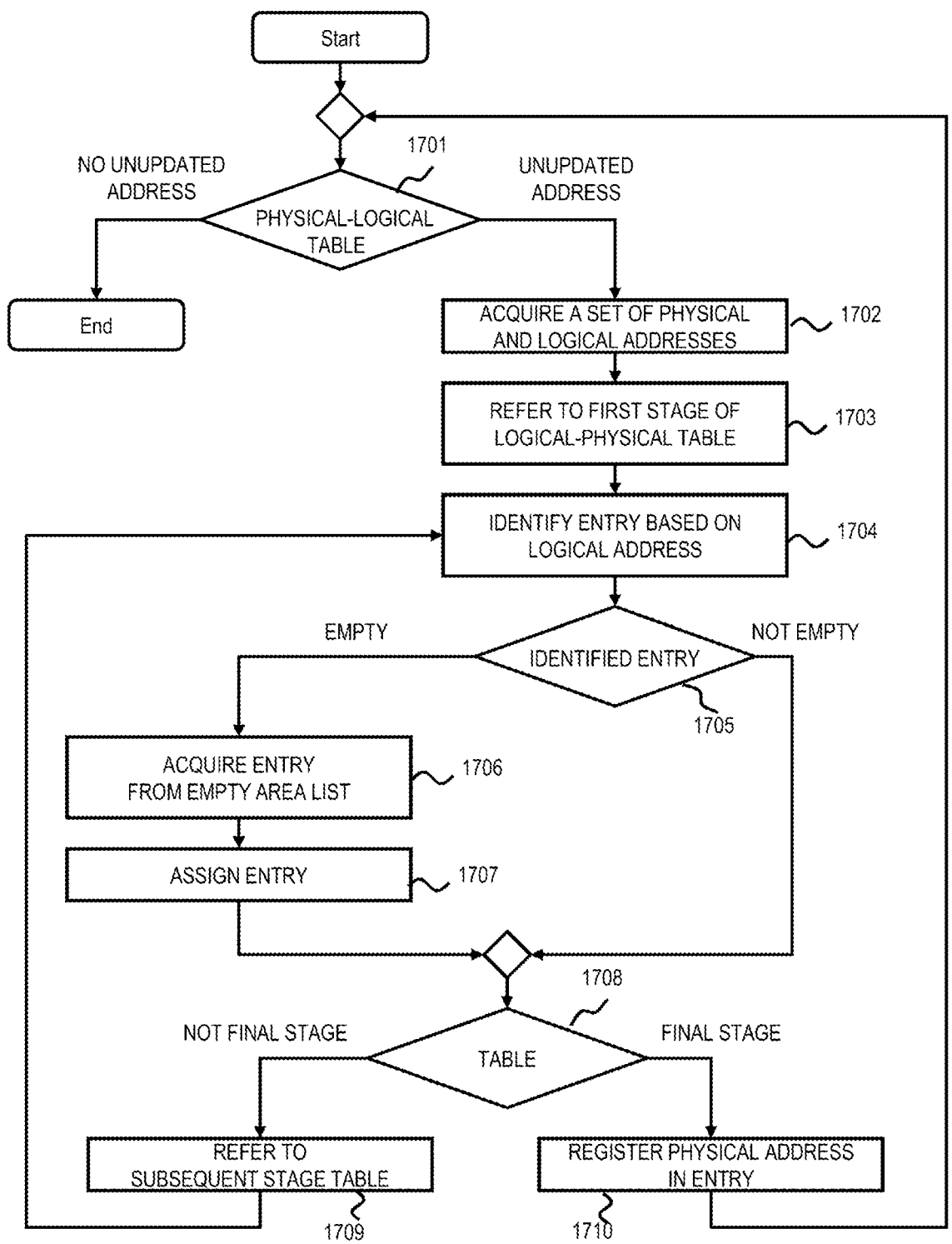
FIG. 15 is a flowchart of a logical-physical table update processing according to the first embodiment.

FIG. 15 is a flowchart of the logical-physical table update processing according to the first embodiment.

The storage control program 210 (strictly, the CPU 101 executing the storage control program 210) refers to the physical-logical address conversion table 221 (step 1701). As a result, when a set of a physical address and a logical address, which is not updated to the logical-physical address conversion table 302, is not present in the physical-logical address conversion table 301 (step 1701: no unupdated address), which means that all sets of physical addresses and logical addresses registered in the physical-logical address conversion table 301 are reflected in the logical-physical address conversion table 302, the storage control program 210 ends the logical-physical table update processing.

On the other hand, when the set of the physical address and the logical address, which is not updated to the logical-physical address conversion table 302, is present in the physical-logical address conversion table 301 (step 1701: unupdated address), the storage control program 210 acquires one set of the physical address and the logical address which is not updated to the logical-physical address conversion table 302 (step 1702).

Next, the storage control program 210 sets a first stage table in the logical-physical address conversion table 302 as a reference target (step 1703), and identifies an entry in the reference target table based on the logical address acquired in step 1702 (step 1704).

As a result, when the identified entry is not empty (step 1705: not empty), the storage control program 210 proceeds the processing to step 1708. On the other hand, when the identified entry is empty (step 1705: empty), the storage control program 210 acquires the entry from the empty area list 410 (step 1706), assigns the acquired entry as an identified entry (step 1707), and proceeds the processing to step 1708.

In step 1708, the storage control program 210 determines whether the reference target table is in a final stage.

As a result, when the reference target table is not a final stage table (step 1708: not a final stage), the storage control program 210 identifies a subsequent stage table based on the entry identified in step 1705 as a reference target (step 1709), and proceeds the processing to step 1704.

On the other hand, when the reference target table is a final stage table (step 1708: a final stage), the storage control program 210 registers the physical address acquired in step 1702 in the entry identified in step 1705 or the entry assigned in step 1707, and proceeds the processing to step 1701.

According to the logical-physical table update processing, using the physical-logical address conversion table 301 generated based on the physical-logical address conversion table 310 stored in the nonvolatile medium 103, the logical-physical address conversion table 302 corresponding to a state of the physical-logical address conversion table 301 can be re-generated.

Next, an end processing when the storage device 100 is stopped will be described.

Figure 16:
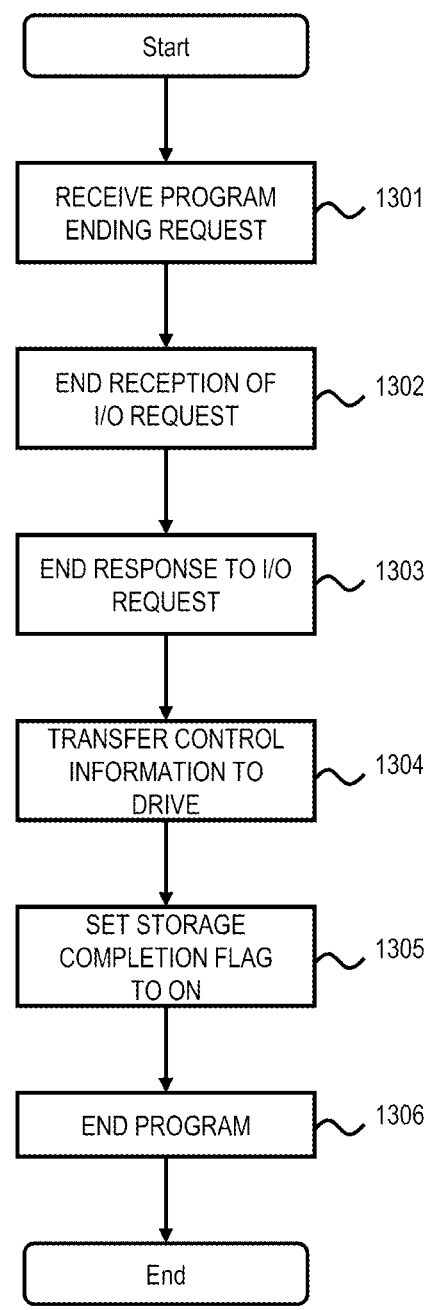
FIG. 16 is a flowchart of an end processing according to the first embodiment.

FIG. 16 is a flowchart of the end processing according to the first embodiment.

When the storage control program 210 (strictly, the CPU 101 executing the storage control program 210) receives a program ending request (step 1301), the storage control program 210 executes the subsequent processing. The ending request may be issued based on an instruction from the user. Alternatively, the storage control program 210 may detect an abnormality or the like in the storage control program 210 and issue the ending request to the storage control program 210.

Next, the storage control program 210 ends the reception of the I/O request (step 1302). Then, the storage control program 210 executes all received I/O requests, and responds an execution result to a request source (step 1303).

Next, the storage control program 210 transfers the control information stored in the virtual address space 300 to the drive 104 to create the control information 320 (step 1304). Thereafter, the storage control program 210 sets the storage completion flag 321 to ON (Step 1305), and ends the storage control program 210 (Step 1306).

According to the end processing, the control information stored in the virtual address space 300 after the processing is performed according to the I/O request, that is, the control information stored in the memory 102, can be stored in the drive 104. In this manner, after the control information stored in the memory 102 can be normally stored in the drive 104, the storage completion flag 321 can be set to ON.

Therefore, when the storage completion flag 321 is set to ON, the control information in the drive 104 can be regarded as control information that is correctly stored in the end processing.

As described above, in the computer system according to the first embodiment, when the physical-logical address conversion table 301 (222) is updated, the physical-logical address conversion table 310 in the nonvolatile medium 103 is also updated. Therefore, a latest state of the physical-logical address conversion table 310 does not disappear when a power outage occurs and the physical-logical address corresponding to the logical address of the I/O request can be acquired based on the physical-logical address conversion table 310 when the storage device 100 is started after the power outage, so that data can be appropriately accessed.

Next, a computer system according to a second embodiment of the invention will be described. A difference from the computer system according to the first embodiment will be mainly described in the second embodiment.

First, an overall configuration of the computer system according to the second embodiment will be described.

Figure 17:
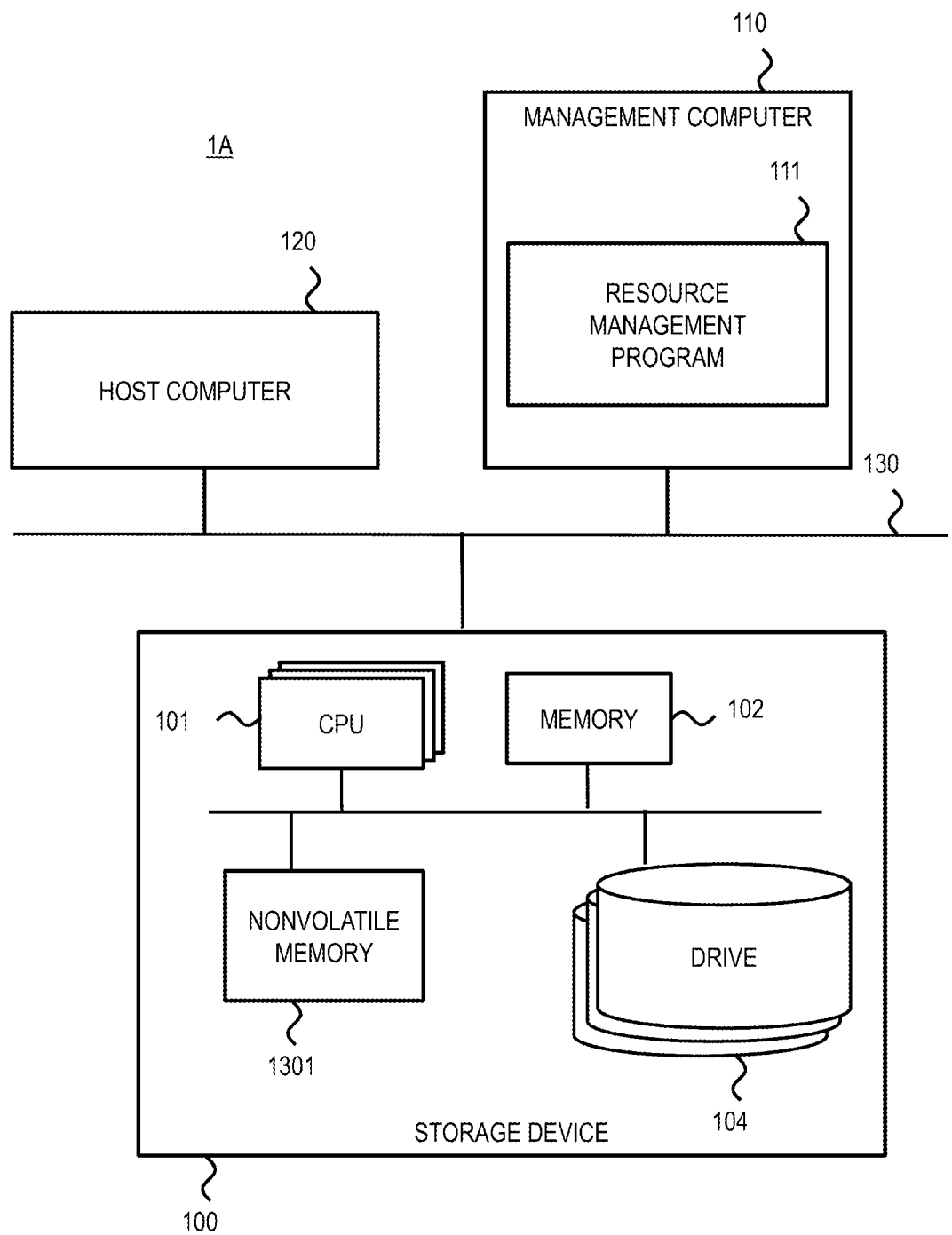
FIG. 17 is an overall configuration diagram of a computer system according to a second embodiment.

FIG. 17 is an overall configuration diagram of the computer system according to the second embodiment.

A computer system 1A according to the second embodiment includes a nonvolatile memory 1301 that serves as an example of the nonvolatile medium 103 and is used as the nonvolatile medium 103 in the computer system 1 according to the first embodiment. The nonvolatile memory 1301 may be, for example, a flash memory (FM), a phase-change random access memory (PRAM), a magnetoresistive random access memory (MRAM), a resistive random access memory (ReRAM), or a ferroelectric random access memory (FeRAM).

Figure 18:
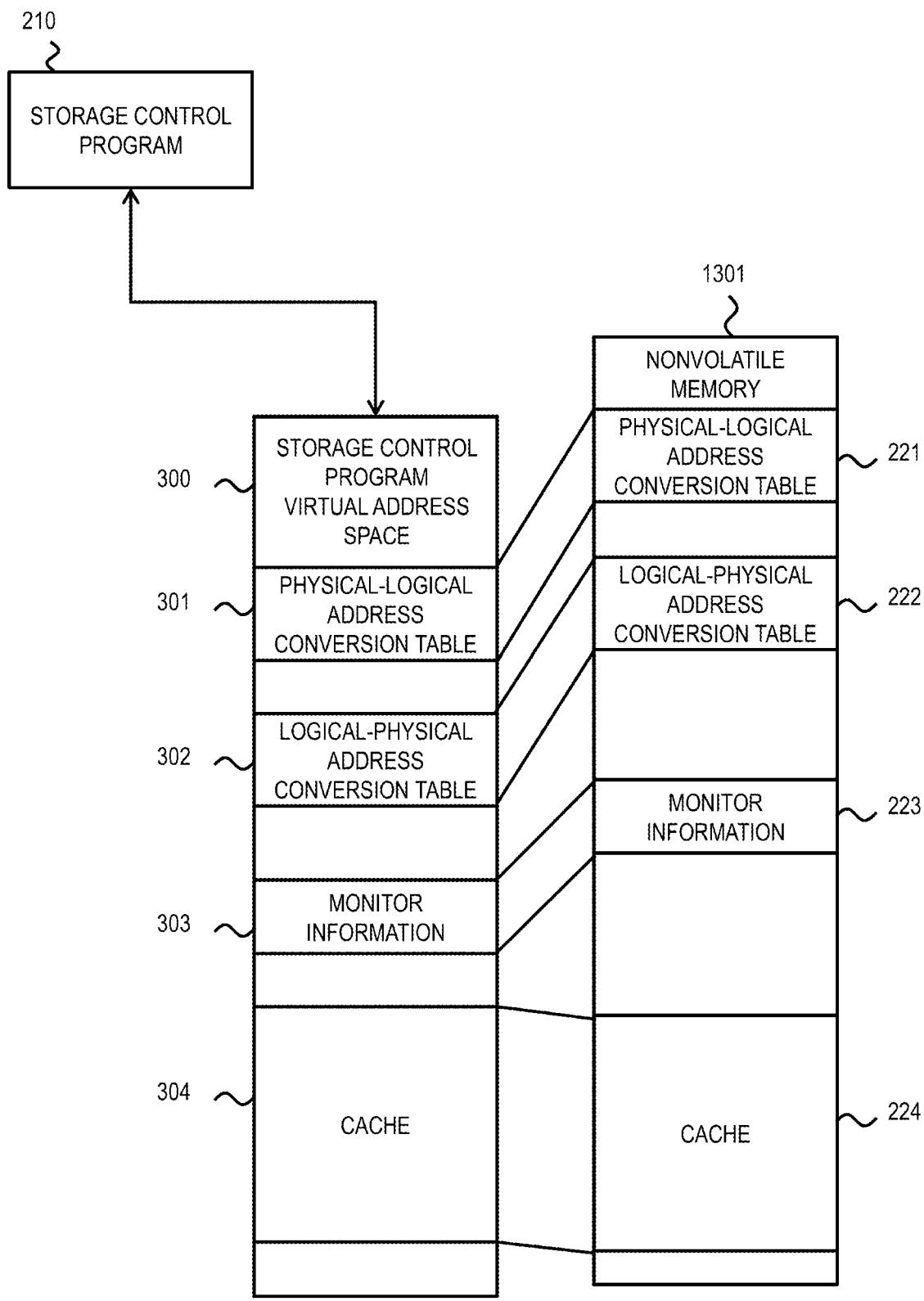
FIG. 18 is a diagram showing information stored in a nonvolatile memory according to the second embodiment.

FIG. 18 is a diagram showing information stored in the nonvolatile memory according to the second embodiment.

The nonvolatile memory 1301 according to the second embodiment stores the physical-logical address conversion table 221, the logical-physical address conversion table 222, the monitor information 223, and the cache 224 that are control information stored in the memory 102 according to the first embodiment. In the second embodiment, the memory 102 does not store the physical-logical address conversion table 221, the logical-physical address conversion table 222, the monitor information 223, and the cache 224. The drive 104 according to the second embodiment may not store the control information 320.

The OS 200 assigns a storage area of the nonvolatile memory 1301 to the virtual address space 300 of the storage control program 210. Since the same virtual address space 300 can be used in the first embodiment and the second embodiment, the storage control program 210 determines whether an area that is actually assigned to the virtual address space 300 is the memory 102 or the nonvolatile memory 1301, so that it is not necessary to change the data access processing for the physical-logical address conversion table 221, the logical-physical address conversion table 222, the monitor information 223, and the cache 224.

Next, a processing operation in the computer system 1A according to the second embodiment will be described.

The processing same as the I/O processing shown in FIG. 8 is performed in the computer system LA. A part of the processing may be different from the processing of the computer system according to the first embodiment in each step shown in FIG. 8. The difference will be described below.

In a physical address acquisition processing in the computer system 1A, the processing in step 707 in the physical address acquisition processing shown in FIG. 9 may not be performed.

In a startup processing in the computer system. 1A, the storage control program 210 (strictly, the CPU 101 executing the storage control program 210) associates a memory space of the nonvolatile memory 1301 that is assigned by the OS 200 with the virtual address space 300 in the storage control program 210, and thereby performs a processing of generating a virtual address space (step 1201), as in step 1201 in the startup processing shown in FIG. 14. Then, step S1205 is performed after the processing in step 1201 is ended. Thereafter, when a result of the step S1205 is that data is not stored in the physical-logical address conversion table 301 (step 1205: empty), the storage control program 210 performs the processing in step 1207. When data is stored in the physical-logical address conversion table 301, the storage control program 210 ends the processing.

In an end processing in the computer system 1A, steps 1304 and 1305 in the end processing shown in FIG. 16 are not performed.

As described above, since the physical-logical address conversion table 221, the logical-physical address conversion table 222, the monitor information 223, and the cache 224 are stored and managed in the nonvolatile memory 1301 of the computer system according to the second embodiment, the above information can be prevented from losing during the power outage. When the storage device 100 is started after the power outage, the data in the drive 104 can be appropriately accessed since the physical address corresponding to the logical address in the I/O request can be acquired. Since the logical-physical address conversion table 222, the monitor information 223, and the cache 224 are not stored in the memory 102, a large amount of empty space can be ensured in the memory 102.

Next, a computer system according to a third embodiment of the present invention will be described. An overall configuration of the computer system according to the third embodiment is the same as the configuration of the computer system 1A according to the second embodiment. Herein, a difference from the computer system according to the first embodiment will be mainly described.

Figure 19:
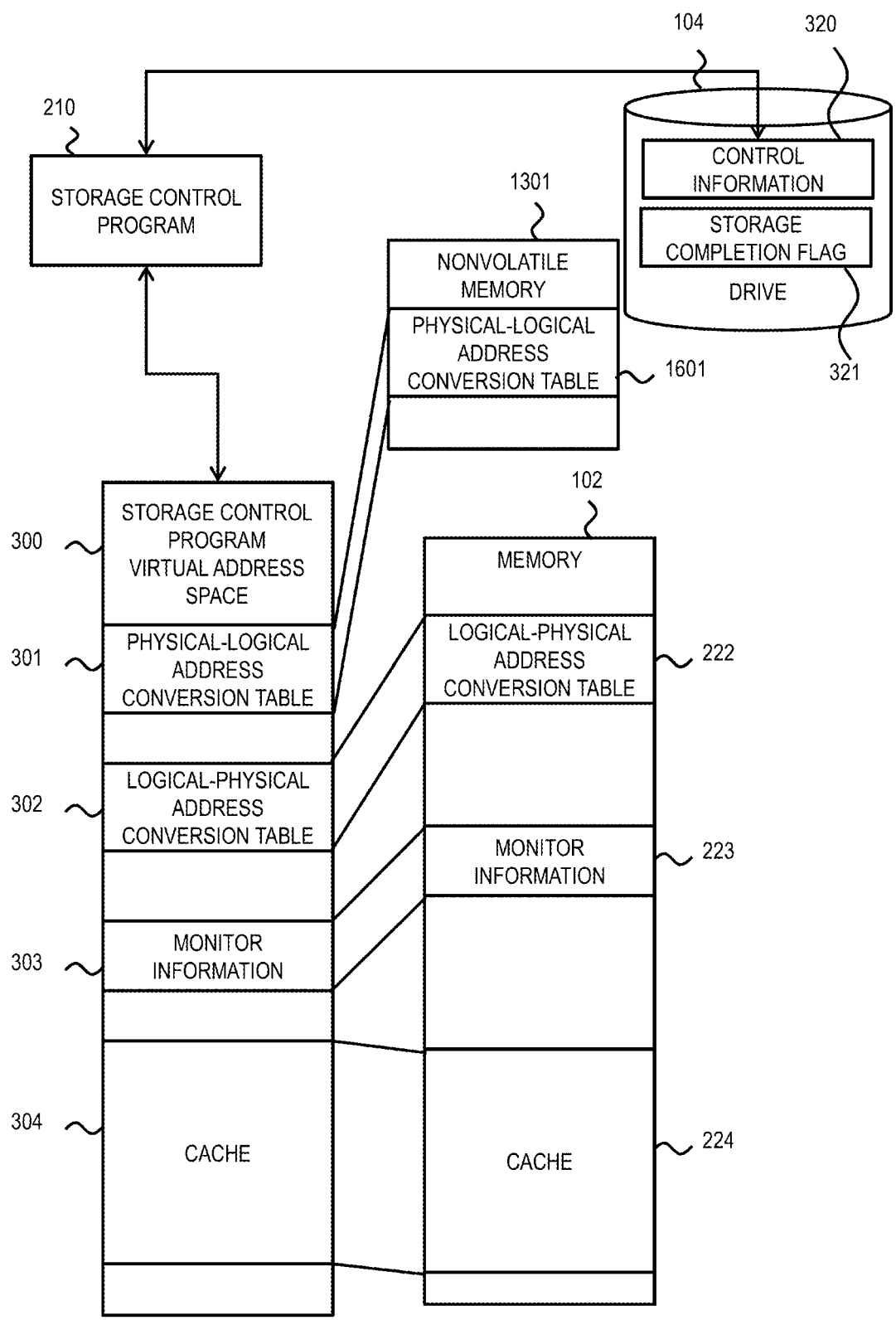
FIG. 19 is a diagram showing information stored in a memory and a nonvolatile memory according to a third embodiment.

FIG. 19 is a diagram showing information stored in a nonvolatile memory according to the third embodiment.

The logical-physical address conversion table 222, the monitor information 223, and the cache 224 are stored in the memory 102.

A physical-logical address conversion table 1601 among the control information is stored in the nonvolatile memory 1301. The physical-logical address conversion table 1601 has a configuration same as that of the physical-logical address conversion table 221.

In the present embodiment, the OS 200 provides the storage control program 210 with the CPU 101, the memory 102, and the nonvolatile memory 1301. Areas of the memory 102 and the nonvolatile memory 1301 that are assigned to the storage control program 210 by the OS 200 are managed as address spaces in the storage control program 210, that is, the virtual address space 300. The physical-logical address conversion table 301, the logical-physical address conversion table 302, the monitor information 303, and the cache 304 are virtually stored in the virtual address space 300. In the present embodiment, an entity of the physical-logical address conversion table 301 in the virtual address space 300 is the physical-logical address conversion table 1601 in the nonvolatile memory 1301, an entity of the logical-physical address conversion table 302 in the virtual address space 300 is the logical-physical address conversion table 222 in the memory 102, an entity of the monitor information 303 in the virtual address space 300 is the monitor information 223 in the memory 102, and an entity of the cache 304 in the virtual address space 300 is the cache 224 in the memory 102.

The CPU 101 executing the storage control program 210 uses a virtual address in the virtual address space 300 to issue an access request for various types of information, and thereby acquires the various types of information. At this time, when detecting the access request from the storage control program 210, the CPU 101 executing the OS 200 converts the virtual address into a physical address indicating a position in the memory 102 or the nonvolatile memory 1301, uses the physical address to access information stored in the memory 102 or the nonvolatile memory 1301, and returns an access result to the storage control program 210. Therefore, in the present embodiment, when accessing information in an area of the virtual address space 300, the storage control program 210 does not recognize whether the entity of the virtual address space 300 is stored in the nonvolatile memory 1301 or the memory 102.

The drive 104 stores, at a predetermined time point (for example, a previous end time point of the storage device 100), the control information 320 corresponding to the control information in the memory 102 and the storage completion flag 321 that serves as an example of normal storage information indicating whether the control information 320 is normally stored in the drive 104. The control information 320 stored in the drive 104 may include the physical-logical address conversion table 221, the logical-physical address conversion table 222, the monitor information 223, and the cache 224, or may include the physical-logical address conversion table 221 only.

Next, a processing operation in the computer system according to the third embodiment will be described.

The processing same as the I/O processing shown in FIG. 8 is performed in the computer system. Apart of the processing may be different from the processing of the computer system according to the first embodiment in each step shown in FIG. 8. The difference will be described below.

In the physical address acquisition processing in the computer system, the processing in step 707 in the physical address acquisition processing shown in FIG. 9 may not be performed.

In the startup processing in the computer system, the storage control program 210 (strictly, the CPU 101 executing the storage control program 210) associates a memory space of the nonvolatile memory 1301 and a memory space of the memory 102 that are assigned by the OS 200 with the virtual address space 300 in the storage control program 210, and thereby performs a processing of generating a virtual address space (step 1201), as in step 1201 in the startup processing shown in FIG. 14. Then, the processing other than step S1204 is performed among the processing after step 1201.

The control information 320 may not be stored in the drive 104 according to the third embodiment. In this case, the processing of transferring control information to and from the drive 104 in the startup processing and end processing is not performed.

As described above, since the physical-logical address conversion table is managed in the nonvolatile memory 1301 and not managed in the memory 102 in the computer system according to the third embodiment, when a physical address is newly assigned to a logical address, the physical address is not stored in the memory 102.

The invention is not limited to the above-described embodiments, and can be appropriately modified and implemented without departing from the spirit of the invention.

For example, although the storage device is an SDS in the above-described embodiments, the invention is not limited thereto. Alternatively, the storage device may be a dedicated storage device provided with a battery. In this case, when a power failure or the like of the battery occurs, data before the failure can be appropriately accessed.

Although the control information is managed in a form of a table in the above-described embodiments, the invention is not limited thereto. Alternatively, the control information may be managed by, for example, information in a log format. To be brief, the control information may be managed in any form as long as information capable of specifying an update result is managed. For example, entire logs of physical-logical address conversion information may be stored in the nonvolatile medium 103 or the nonvolatile memory 1301, or logs subsequent to a log stored in the drive 104 may be stored in the nonvolatile medium 103 or the nonvolatile memory 1301.

Although the startup processing shown in FIG. 14 is performed and the logical-physical address conversion table 302 is updated to the latest state during the startup in the above-described embodiments, the invention is not limited thereto. Alternatively, the I/O processing in FIG. 8 may be performed without performing the startup processing shown in FIG. 14. In this case, when there is an I/O request for a logical address that is not registered in the logical-physical address conversion table 302, a physical address for an accessed logical address can be acquired and the logical-physical address conversion table can be updated in steps 703, 704, and 709 in the physical address acquisition processing in FIG. 9. Accordingly, data corresponding to the I/O request can be appropriately acquired from the drive 104. In this manner, when the startup processing shown in FIG. 14 is not performed, the I/O processing can be performed quickly without the need of restoring the entire logical-physical address conversion table 302.

What is claimed is:

1. A storage device that receives an I/O request from a host computer and performs an I/O processing in response to the I/O request, the storage device comprising:
a processor unit;
a first nonvolatile medium; and
a memory having access performance higher than that of the first nonvolatile medium,
wherein the storage device includes control information about a control performing the I/O processing,
wherein the control information includes address conversion information for converting a physical address of a memory device in which target data of the I/O request is stored and a logical address that indicates a logical area of data stored in the physical address,
wherein the address conversion information includes physical-logical address conversion information for converting the physical address into the logical address, and logical-physical address conversion information for converting the logical address into the physical address,
wherein the processor unit:
stores the physical-logical address conversion information in the first nonvolatile medium and the memory;
stores the logical-physical address conversion information in the memory; and when returning from a power source cut off, generates the logical-physical address conversion information based on the physical-logical address conversion information in the first nonvolatile medium,
wherein the physical-logical address conversion information is managed by a one-stage table, and the logical-physical address conversion information is managed by a multi-stage table,
wherein the control information stored in the memory is further stored into a second nonvolatile medium, and a storage completion flag is stored in the second nonvolatile memory to indicate that the control information has been successfully stored in the second nonvolatile memory,
wherein the logical-physical address conversion information is read from the second nonvolatile medium when the storage completion flag is present, and
wherein the logical-physical address conversion information is created from the physical-logical address conversion information in the first nonvolatile medium when the storage completion flag is not present.

2. The storage device according to claim 1, wherein the processor unit synchronously stores the address conversion information of the control information into the memory and the first nonvolatile medium, and
wherein the processor unit performs the I/O processing using the address conversion information stored in the memory.

3. The storage device according to claim 2, wherein the processor unit performs:
first storage of synchronously storing the control information including the address conversion information into the memory and the first nonvolatile medium; and
second storage of storing the control information into a second nonvolatile medium at a frequency smaller than a frequency of the first storage.

4. The storage device according to claim 2, wherein the address conversion information stored in the memory and the address conversion information synchronously stored in the first nonvolatile medium have a same target address.

5. The storage device according to claim 1, wherein the processor unit uses the logical-physical address conversion information to access data in the memory device.

6. A storage device that receives an I/O request from a host computer and performs an I/O processing in response to the I/O request, the storage device comprising:
a processor unit;
a first nonvolatile medium; and
a memory having access performance higher than that of the first nonvolatile medium,
wherein the storage device includes control information about a control performing the I/O processing,
wherein the control information includes address conversion information for converting a physical address of a memory device in which target data of the I/O request is stored and a logical address that indicates a logical area of data stored in the physical address,
wherein the address conversion information includes physical-logical address conversion information for converting the physical address into the logical address, and logical-physical address conversion information for converting the logical address into the physical address,
wherein the processor unit:
stores the physical-logical address conversion information in the first nonvolatile medium and the memory;
stores the logical-physical address conversion information in the memory; and when returning from a power source cut off, generates the logical-physical address conversion information based on the physical-logical address conversion information in the first nonvolatile medium, wherein the processor unit synchronously stores the address conversion information of the control information into the memory and the first nonvolatile medium, and wherein the processor unit performs the I/O processing using the address conversion information stored in the memory, wherein the processor unit performs:
first storage of synchronously storing the control information including the address conversion information into the memory and the first nonvolatile medium; and
second storage of storing the control information into a second nonvolatile medium at a frequency smaller than a frequency of the first storage, wherein the control information stored in the memory is further stored into the second nonvolatile medium by performing the second storage, and a storage completion flag is stored in the second nonvolatile memory to indicate that the control information has been successfully stored in the second nonvolatile memory, wherein address conversion information on which the second storage is performed is read from the second nonvolatile medium when the storage completion flag is present, and wherein address conversion information on which the first storage is performed is read from the first nonvolatile medium when the storage completion flag is not present.

7. The storage device according to claim 1, wherein the control information stored in the memory includes a cache space, monitor information, and a part of the address conversion information.

8. The storage device according to claim 7, wherein the control information stored in the first nonvolatile medium does not include a cache space or monitor information.

9. The storage device according to claim 1, wherein the first nonvolatile medium is a memory device that stores data relating to the I/O processing.

10. The storage device according to claim 1, wherein the memory is volatile.

11. A control method in a storage device that receives an I/O request from a host computer and performs an I/O processing in response to the I/O request, the storage device including a processor unit, a first nonvolatile medium, and a memory having access performance higher than that of the first nonvolatile medium, the control method comprising:
storing control information about a control of performing the I/O processing, the control information including address conversion information for converting a physical address of a memory device in which target data of the I/O request is stored and a logical address that indicates a logical area of data stored in the physical address, the address conversion information including physical-logical address conversion information for converting the physical address into the logical address, and logical-physical address conversion information for converting the logical address into the physical address, the processor unit
storing the physical-logical address conversion information in the first nonvolatile medium and the memory,
storing the logical-physical address conversion information in the memory, and
when, in response to returning from a power source cut off, generating the logical-physical address conversion information based on the physical-logical address conversion information in the first nonvolatile medium, wherein the physical-logical address conversion information is managed by a one-stage table, and the logical-physical address conversion information is managed by a multi-stage table, wherein the control information stored in the memory is further stored into a second nonvolatile medium, and a storage completion flag is stored in the second nonvolatile memory to indicate that the control information has been successfully stored in the second nonvolatile memory, wherein the logical-physical address conversion information is read from the second nonvolatile medium when the storage completion flag is present, and wherein the logical-physical address conversion information is created from the physical-logical address conversion information in the first nonvolatile medium when the storage completion flag is not present.

* * * * *